United States Patent [19]

Leclercq et al.

[11] Patent Number: 4,522,708
[45] Date of Patent: Jun. 11, 1985

[54] CATALYTIC REFORMING PROCESS EMPLOYING REFORMING CATALYSTS WHICH ARE BASED ON TUNGSTEN AND MOLYBDENUM CARBIDES

[75] Inventors: Lucien Leclercq, Villeneuve D'Asq; Marcelle Provost, Poitiers, both of France

[73] Assignee: Eruotungstene-Poudres, Grenoble, France

[21] Appl. No.: 589,683

[22] Filed: Mar. 15, 1984

[30] Foreign Application Priority Data

Mar. 25, 1983 [FR] France ................................ 83 05480

[51] Int. Cl.³ .............................................. C01G 35/06
[52] U.S. Cl. ...................................... 208/136; 208/134; 208/135; 502/177; 502/182; 585/420; 585/477
[58] Field of Search ............... 502/177, 182, 305, 323; 208/136, 134, 135, 133; 585/420, 477, 418

[56] References Cited

U.S. PATENT DOCUMENTS

| | | | |
|---|---|---|---|
| 2,755,228 | 7/1956 | Anhorn et al. | 208/136 |
| 3,865,750 | 2/1975 | Rase et al. | 208/134 |
| 4,300,952 | 11/1981 | Ingelström et al. | 75/241 |
| 4,325,843 | 4/1982 | Slaugh et al. | 502/177 |
| 4,330,332 | 5/1982 | Schachner et al. | 423/440 |
| 4,414,182 | 11/1983 | Okamoto et al. | 502/177 |

*Primary Examiner*—Patrick P. Garvin
*Assistant Examiner*—Anthony McFarlane
*Attorney, Agent, or Firm*—McDougall, Hersh & Scott

[57] ABSTRACT

The present invention relates to catalysts for reforming petroleum products in mass form or supported for example, on aluminium or active carbon, the active part of which consists of tungsten and molybdenum carbides corresponding to the general formula:

$$(Mo_x W_{1-x})_y C_z$$

wherein
$0 < x < 1$
$1 \leq y \leq 2$
$0.8 \leq z \leq 1$

Nitridation prior to their use in a mixture $H_2 + N_2$ substantially increases the activity and selectivity thereof.

These catalysts are not very sensitive to contamination by sulphur products.

6 Claims, No Drawings

CATALYTIC REFORMING PROCESS EMPLOYING REFORMING CATALYSTS WHICH ARE BASED ON TUNGSTEN AND MOLYBDENUM CARBIDES

The present invention relates to catalysts for reforming petroleum products in a bulk form or a supported form, the active part of which consists of tungsten and molybdenum carbides and to the use thereof.

Simple tungsten carbides and molybdenum carbides have been used as catalysts for various reactions in the field of petrochemistry; the reactivity of molybdenum carbide in bulk form in the hydrogenolysis of ethane in particular was studied by Sinfelt et al. in the publication "Nature Physical Science" 229 (1971), 27. Furthermore Boudart et al., in "Science" 181 (1973), 547 discovered that tungsten carbide ressembles platinum in the isomerisation reaction of dimethyl-2,2 propane.

More recently, a U.S. Pat. No. 4,271,041 (June 2, 1981) by Leclercq and Boudart described the synthesis of molybdenum oxycarbides having an area of up to 60 $m^2g^{-1}$ and their use in the catalytic synthesis of hydrocarbons from CO and $H_2$.

With respect to the supported carbides, Mitchell et al. in the "Journal of Catalysis", 78 (1982) 116–125, synthesized molybdenum carbide catalysts ($Mo_2C$) supported on active carbons which are obtained from coconuts (Girdler G 32).

Catalysts supported on alumina were used in the methanation reaction using $H_2$ and CO in, for example, the U.S. Pat. Nos. 4,325,842, 4,326,992 with respect to $Mo_2C$ or in the U.S. Pat. Nos. 4,325,843, 4,331,544, 4,155,928, 4,219,445 with respect to WC.

However, none of these documents describes or proposes the use of corresponding mixed carbides as catalysts for reforming petroleum products, that is to say in reactions which enable petrol with a higher octane index to be obtained using naphtha and in particular by the catalysis of dehydrocyclisation and isomerisation reactions and the partial inhibition of hydrogenolysis reactions.

The present invention thus relates to reforming catalysts which consist of mixed carbides of Mo and W, corresponding to the general formula $(Mo_wW_{1-x})_yC_z$ in which:

$$0 < x < 1, 1 \leq y \leq 2 \text{ and } 0.8 \leq z \leq 1.$$

The structure of these carbides evolves from the simple WC type hexagonal structure for y which is vicinal to 1 to the compact $Mo_2C$ type hexagonal structure for y which is vicinal to 2.

The preferred values for x range from 0.15 to 0.70.

These catalysts may be used in a bulk form or in a dispersed form on an adequate support, preferably in alumina or in active carbon.

In comparison with catalysts which are based on Pt which are conventionally used in catalytic reforming, these catalysts are advantageously less expensive and have an elevated resistance to contamination by sulphured products (thioresistance). The use of these catalysts makes redundant a preliminary stage of hydrotreatment of the petroleum products to remove the sulphur compounds. This thioresistance will be illustrated by an example.

The production of these catalysts is as follows:

Catalysts in bulk form: these catalysts are produced using an aqueous suspension of ammonium paratungstate and/or ammonium paramolybdate the acids of which are coprecipitated (or the acid is precipitated) by addition of hydrochloric acid. After several washing-decantations, the precipitate is filtered and dried at from 370 to 390 K. Carburation is carried out by two methods:

(a) either in two stages: reduction of the acids (or the acid) by hydrogen at from 1,070 to 1,170 K., and subsequent carburation of metals (or the metal) by the carbon (acetylene black) at from 1,770 to 1,870 K., under a hydrogen protective atmosphere.

(b) Or in one stage: reduction of the acids (or the acid) by hydrogen at 870 K., replacement of hydrogen by carbon monoxide and carburation under this gas at 1,270 K.

These catalysts have a Fisher granulometry of less than 5 microns.

Supported catalysts:

On alumina:

Two methods are used:

(c) An alumina having a large specific surface (for example Exal. Gamma of 100 $m^2.g^{-1}$ specific surface) is impregnated with an aqueous solution of ammonium paratungstate and/or ammonium paramolybdate, and subsequently dried at 420 K. Reduction-carburation is carried out in a single stage using hydrogen (reduction) to 870 K. and then carbon monoxide (carburation) at from 870 to 1,270 K.

(d) In a receiver in silica, the ammonium alum $Al_2(SO_4)_3.(NH_4)_2SO_4.24H_2O$ is melted at from 370 to 470 K. and, in the liquid product, the ammonium paratungstate powder and/or the ammonium paramolybdate powder is dissolved with stirring for homogenisation. The mixture is subsequently brought to 670 K. over a period of several hours and thereby decomposes into finely-divided alumina containing a homogeneous dispersion of tungsten and/or molybdenum oxide. Reduction-carburation is carried out in a single stage using hydrogen (reduction) to 870 K., and then carbon monoxide (carburation) at from 870 to 1,270 K.

On active carbon

The catalysts on active carbon are produced by successive impregnations of active carbon using ammonium molybdate and ammonium tungstate solutions which are evaporated to dryness in air at 400 K. in a glass reactor vessel. The mass is subsequently calcinated under nitrogen at 773 K. over a period of 16 hours to remove the ammonium ions in the form of ammonia. This calcination is followed by a reduction of the W and Mo oxides which have formed, under hydrogen at 773 K.

The resulting compounds which are thus formed are then heated under hydrogen to 1,073 K. and react with the support carbon to produce mixed carbides of tungsten and molybdenum. The active carbon which is used is marketed under the name of "cecalite" (CECA SA 1961). It is ground and sifted to obtain particles ranging from 0.125 to 0.160 mm in size. The total volume of the pores is 0.3 $cm^3/g$ and the B.E.T. surface is 610 $m^2/g$. This carbon also contains a W content, by weight, of 900 ppm and an Mo content, by weight, of 280 ppm and also a sulphur content, by weight, of 0.16%.

It has surprisingly been found that the preliminary nitridation of the catalyst before it is used in a mixture $N_2+H_2$ (preferably equimolecular) at about 1023 K., substantially increases the activity and the selectivity of the said catalyst.

The term "activity of the catalyst" is to be understood as designating the ratio of the number of mols of the starting material which are transformed by unit of time during a reaction of a determined type to the mass of catalyst which is used. The activity of the catalyst may be expressed, for example, in mol $h^{-1} g^{-1}$. For the catalysts in bulk form, the mass of the catalyst itself is taken into account; for the supported catalysts, the mass of the elements W and/or Mo of the catalyst are conventionally taken into account.

The term "selectivity of the catalyst" is to be understood as designating the ratio of the speeds of transformation of the initial material during a reaction of a determined type to the total speed of transformation of the initial material.

The following Examples illustrate the present invention and allow it to be more easily understood.

The activity and the selectivity of the catalysts are measured during various typical reactions which are representative of the reforming process such as:

(a) the reaction of n-hexane in the presence of hydrogen for which the following types of reaction have been chosen:

Hydrogenolysis or cracking of the n-hexane producing rupture products of carbon-carbon bonds, into methane to pentane and the ethylene, propene, butene and pentene dehydrogenated derivatives thereof (activity $V_H$ and selectivity $S_H$).

Isomerisation: the main products are dimethylbutanes and methyl-2 and methyl-3 pentane (activity $V_i$ and selectivity $S_i$).

Dehydrogenation: this mainly produces mono-olefins (hexene 1, cis and trans hexenes 2) - activity $V_O$ and selectivity $S_O$.

Dehydrocyclisation: transforms the n-hexane into benzene in particular but also into smaller quantities of methyl cyclopentane, into cyclohexane, cyclohexene and cyclohexadienes (activity $V_c$ and selectivity $S_c$).

Homologation: increases the carbonated chain of a carbon to produce toluene.

The total activity $V_t$ is the sum of the above-mentioned activities.

(b) Dehydrogenation of cyclohexane into benzene (favourable reaction).

(c) Hydrogenolysis of butane into methane, ethane, propane (unfavourable reaction).

EXAMPLE 1

Catalysts in Bulk Form

Catalysts in bulk form, the compositions by weight, and the specific surfaces of which are compiled in Table I, are produced according to the above-mentioned method (a)

TABLE I

Composition of the catalysts in bulk form which are based on Mo and W carbide

| | | Contents given in grams for 100 g of the raw product | | | | |
|---|---|---|---|---|---|---|
| REF | CATALYSTS | W | Mo | C total | C free | BET surface ($m^2 \cdot g^{-1}$) |
| WC-2 | WC | 93.5 | — | 6.17 | 0.10 | 2.7 |
| A1 | (W,Mo) C | 90.85 | 2.87 | 6.28 | 0.01 | 1.5 |
| B | " | 83.65 | 9.58 | 6.77 | 0.14 | 1.2 |
| B1 | " | 83.66 | 9.54 | 6.80 | 0.22 | 1.2 |
| C1 | " | 79.21 | 13.86 | 6.93 | 0.09 | 1.7 |
| D1 | " | 78.42 | 14.65 | 6.93 | 0.01 | 0.5 |
| E1 | $Mo_2C_{1-\epsilon}$ | — | 93.86 | 6.14 | 0.32 | 0.5 |

TABLE I-continued

Composition of the catalysts in bulk form which are based on Mo and W carbide

| | | Contents given in grams for 100 g of the raw product | | | | |
|---|---|---|---|---|---|---|
| REF | CATALYSTS | W | Mo | C total | C free | BET surface ($m^2 \cdot g^{-1}$) |
| E2 | $Mo_2C_{1-\epsilon}$ | — | 94 | 6.12 | 0.31 | 0.5 |

The reactions are carried under atmospheric pressure in a dynamic reactor having continuous flux containing the catalyst on a fritted quartz plate. The reaction products are quantitatively analysed using chromatography in the gaseous phase.

(a) The experimental conditions of reforming the n-hexane are as follows: the temperature is 773 K., the ratio of the partial pressures of hydrogen ($P_H$) and hydrocarbon ($P_C$) is equal to: 9 ($P_H=0.9$ atm. and PC=0.1 atm.); the hexane flow-rate is $1.532.10^{-2}$ mols per hour.

The speeds of the various reactions, expressed in $10^{-4}$ mols of n-hexane which is transformed into each of the reaction products per hour and per gram of catalyst, are compiled in Table II

TABLE II

Activity of the catalysts in bulk form in the reforming of n-hexane

| Ref. | Catalysts | $V_H$ | $V_O$ | $V_C$ | $V_T$ |
|---|---|---|---|---|---|
| WC-2 | WC | 0.33 | 0.44 | 0.18 | 0.95 |
| B1 | (Mo,W) C | 0.42 | 0.65 | 0.42 | 1.49 |
| C1 | " | 0.71 | 1.89 | 0.38 | 2.98 |
| D1 | " | 1.18 | 0.29 | 0.24 | 1.71 |
| E2 | $Mo_2C_{1-\epsilon}$ | 0.11 | 0.18 | 0.1 | 0.39 |

The mixed carbides in bulk form are always more active overall than the monometallic carbides by from 1.5 to 7.5 for the total speeds. They have, moreover, an activity maximum for a type of given reaction ($B_1$ for the formation of cyclic and aromatic products, $C_1$ for the formation of olefins, $D_1$ for the formation of hydrogenation products).

The selectivity of the catalysts which were tested is compiled in Table III.

TABLE III

Selectivity of the catalysts in bulk form

| Ref. | Catalysts | $S_H$ | $S_O$ | $S_C$ |
|---|---|---|---|---|
| WC-2 | WC | 0.347 | 0.463 | 0.190 |
| B1 | (W,Mo) C | 0.282 | 0.436 | 0.282 |
| C1 | " | 0.238 | 0.634 | 0.128 |
| D1 | " | 0.690 | 0.170 | 0.140 |
| E2 | $Mo_2C_{1-\epsilon}$ | 0.282 | 0.462 | 0.256 |

The mixed carbides have a great diversity of selectivity as a function of the relative composition of molybdenum and of tungsten. The catalyst $B_1$ increases the selectivity of cyclic and aromatic products with respect to the monometallic tungsten and molybdenum carbides, $C_1$ the selectivity of olefins, $D_1$ of cracking or hydrogenolysis products.

(b) The experimental conditions of the dehydrogenation of cyclohexane are as follows: the temperature is 623 K., the ratio of partial pressure of hydrogen ($P_H$) and hydrocarbon ($P_C$) is equal to: 9 ($P_H=0.9$ atm. and $P_C=0.1$ atm.); the flow-rate of cyclohexane is $1.85.10^{-2}$ mols per hour.

The speed of the reaction, expressed in $10^{-4}$ mols of cyclohexane which are transformed into benzene per hour and per gram of catalyst, is compiled in Table IV, as is the relative atomic composition of metal $$\% \left( \frac{Mo}{Mo + W} \right),$$

the stoichiometry metal-carbon of the carbide $$\left( \frac{C}{W + Mo} \right)$$

and the rate of free carbon $$\left( \frac{C_L}{W + Mo} \right).$$

TABLE IV

Activity ($V_D$) of the W and Mo mixed carbides in bulk form in the dehydrogenation of cyclohexane

| CATA-LYSTS | $\% \frac{Mo}{Mo + W}$ (a) | $\frac{C^-}{W + Mo}$ (b) | $\frac{C_L}{W + Mo}$ (c) | S $m^2g^{-1}$ (d) | $V_D$ (e) |
|---|---|---|---|---|---|
| WC-2 | 0 | 0.992 | 0.016 | 2.4 | 15.5 |
| A1 | 5.70 | 0.997 | 0.0016 | 1.5 | 11.6 |
| B1 | 17.91 | 0.988 | 0.028 | 1.2 | 6.6 |
| C1 | 25.09 | 0.990 | 0.013 | 1.7 | 41.7 |
| D1 | 26.36 | 0.996 | 0.001 | 0.4 | 5.9 |
| E1 | 100 | 0.496 | 0.027 | 0.4 | 5.5 |

(a) Atomic ratio giving the percentage of molybdenum atoms to the total number of metal atoms (W + Mo).
(b) Rate of carburation = atomic ratio of the number of carbon atoms joined to the metal (carbide type $C^-$) per atom.
(c) Rate of free carbon = atomic ratio of the number of free carbon atoms ($C_L$) per metallic atom.
(d) Specific area of the catalyst.
(e) Speed of dehydrogenation of the cyclohexane into benzene.

It can be seen that there is a composition for which the speed of dehydrogenation of the cyclohexane into benzene is greater than that of the monometallic carbides (catalyst C1).

(c) The hydrogenolysis reaction of the butane into methane, ethane, propane, is accompanied by isomerisation into isobutane. The experimental conditions are as follows: the temperature is 623 K., $P_H/P_C=9$, $P_H=0.9$ atm. and $P_C=0.1$ atm.; the flow-rate of butane is 0.02 mols per hour. The speeds of the hydrogenolysis and isomerisation reactions, expressed in $10^{-5}$ mols of butane which are transformed into each of the reaction products per hour and per gram of catalyst, are compiled in Table V.

TABLE V

Activity of the W and Mo mixed carbides in bulk form in the hydrogenolysis of butane

| CATALYSTS | (a) $V_H$ | (b) $V_i$ | (c) $\frac{V_D}{V_H}$ |
|---|---|---|---|
| WC-2 | 8.9 | 0.62 | 17.5 |
| A1 | 5.4 | 0.63 | 21.5 |
| B1 | 1.4 | 0.23 | 47 |
| C1 | 9.1 | 1.3 | 46 |
| D1 | 1.1 | 0.23 | 53.5 |
| E1 | 1.54 | 0.4 | 36 |

(a) Hydrogenolysis speed of butane into methane, ethane, propane.
(b) Isomerisation speed of butane into isobutane.
(c) Ratio of the dehydrogenation speeds of cyclohexane and the hydrogenolysis speeds of butane at the same temperature of 350° C.

On the catalysts, the hydrogenolysis speed of butane ($V_H$) is much poorer than the dehydrogenation of cyclohexane ($V_D$). The ratios of the speeds $V_D/V_H$ which are most favourable are those of the catalysts $B_1$, $C_1$, $D_1$ which are based on mixed carbides.

EXAMPLE 2

Supported Catalysts

The supported catalysts, the compositions of which are compiled in Tables VI and VII, are produced according to the above-mentioned methods.

TABLE VI

Composition in bulk form of the catalysts (based on Mo and W carbide) which are supported on alumina

| REF. | CATALYSTS/ SUPPORT | Contents expressed in gram for 100 g of crude product | | | |
|---|---|---|---|---|---|
| | | W | Mo | C total | C free |
| $I_1$ (+) | WC/Al$_2$O$_3$ | 5.3 | — | 0.62 | 0.35 |
| $I_2$ (+) | (W,Mo) C/Al$_2$O$_3$ | 6.1 | 0.40 | 0.73 | 0.35 |
| $I_3$ (++) | " | 31.0 | 3.0 | 3.17 | 0.43 |
| $K_1$ | " | 4.32 | 0.73 | 0.34 | 0.06 |
| $K_2$ | " | 3.08 | 1.21 | 0.36 | 0.10 |
| $K_3$ | " | 2.70 | 1.82 | 1.07 | 0.81 |

(+) Production method (c)
(++) Production method (d)

TABLE VII

Composition in bulk form of the catalysts (based on Mo and W carbide) which are supported on active carbon

| REF. | CATALYSTS/ SUPPORT | Contents expressed in gram for 100 g of crude product | | | |
|---|---|---|---|---|---|
| | | W | Mo | C total | C free |
| MLC$_1$ | WC/C active | 8.14 | 0.025 | 77.8 | — |
| MLCl-A | (W,Mo) C/C active | 5.83 | 1.98 | — | — |
| MLC-B-4 | " | 2.89 | 1.27 | — | — |
| MLC-B-5 | " | 2.54 | 2.59 | — | — |
| MLC-2 | " | 4.85 | 4.99 | 78.5 | — |
| MLC-3 | " | 6.04 | 8.21 | 81.03 | — |
| MLC-B-6 | " | | | | |
| MLC-4 | Mo$_2$C/C active | — | 9 | 78.5 | |
| K 4 | (W,Mo) C/C active | 2.0 | 0.67 | — | — |
| K 5 | " | 2.35 | 1.12 | — | — |
| K 6 | " | 2.68 | 1.83 | — | — |

(a) Reforming of n-hexane: The activity of these tungsten and molybdenum mixed carbides which are supported on alumina and active carbon is measured at T=823 K., under atmospheric pressure $P_H/P_C=9$, the hexane flow-rate being $1,532.10^{-2}$ mols per hour (Table VIII). The activity, expressed in $10^{-2}$ mols per hour$^{-1}$ per g$^{-1}$ of (W+Mo), is of two sizes greater than those obtained with the catalysts in mass form.

TABLE VIII

Activity of the supported W and Mo mixed carbides in the reforming of n-hexane

| Ref/ method | Support Catalyst | $V_H$ | $V_C$ | $V_O$ | $V_i$ | $V_T$ |
|---|---|---|---|---|---|---|
| MLC$_1$ | WC/C | 3.2 | 0.68 | 0.44 | 0.0025 | 4.75 |
| MLC$_2$ | (W,Mo) C/C | 2.06 | 2.54 | 0.19 | 0.03 | 4.82 |
| MLC$_3$ | " | 1.56 | 0.68 | 0.44 | 0.022 | 3.28 |
| MLC$_4$ | Mo$_2$C/C | 2.09 | 0.65 | 0.48 | 0.021 | 3.24 |
| $I_1$/c | WC/Al$_2$O$_3$ | 1.65 | 1.76 | 0.19 | 0.015 | 3.62 |
| $I_2$/c | (W,Mo) C/Al$_2$O$_3$ | 0.93 | 1.22 | 0.37 | 0.014 | 2.53 |
| $I_3$/d | " | 0.22 | 0.17 | 0.11 | 0.0025 | 0.503 |
| $I_2$ nitrided at 823 K | | 0.76 | 0.73 | 0.32 | 0.006 | 1.82 |
| $I_2$ nitrided at 1023 K | | 1.50 | 2.22 | 0.33 | 0.021 | 4.07 |
| $K_1$ | (W,Mo) C/Al$_2$O$_3$ | 0.48 | 1.97 | 0.83 | 0.3 | 3.58 |
| $K_2$ | " | 1.14 | 4.4 | 1.80 | 0.55 | 7.89 |
| $K_3$ | " | 0.87 | 3.3 | 1.16 | 0.44 | 5.77 |
| $K_4$ | (W,Mo) C/C | 3.82 | 2.00 | 2.42 | 0.22 | 8.46 |
| $K_5$ | " | 6.38 | 3.83 | 3.83 | 0.46 | 14.49 |

TABLE VIII-continued

Activity of the supported W and Mo mixed carbides in the reforming of n-hexane

| Ref/method | Support Catalyst | $V_H$ | $V_C$ | $V_O$ | $V_i$ | $V_T$ |
|---|---|---|---|---|---|---|
| $K_6$ | " | 3.75 | 1.50 | 1.59 | 0.18 | 7.02 |

The selectivity is compiled in the following Table IX:

TABLE IX

Selectivity of the tungsten and molybdenum mixed carbides which are supported on alumina and active carbon in the reforming of n-hexane

| Ref. | catalyst/support | Atomic fraction Mo/Mo + W | $S_H$ | $S_C$ | $S_O$ | $S_i$ | $S_{B/C}^{(a)}$ |
|---|---|---|---|---|---|---|---|
| MLC$_1$ | WC/C | 0 | 0.751 | 0.158 | 0.085 | 0.006 | 0.939 |
| MLC$_2$ | (Mo,W) C/C | 0.6635 | 0.428 | 0.526 | 0.040 | 0.006 | 0.969 |
| MLC$_3$ | " | 0.7225 | 0.476 | 0.206 | 0.133 | 0.007 | 0.870 |
| MLC$_4$ | Mo$_2$C/C | 1 | 0.645 | 0.20 | 0.148 | 0.006 | 0.855 |
| I$_1$ | WC/Al$_2$O$_3$ | 0 | 0.456 | 0.487 | 0.053 | 0.004 | 0.886 |
| I$_1$ | (Mo,W) C/Al$_2$O$_3$ | 0.1116 | 0.363 | 0.481 | 0.146 | 0.005 | 0.983 |
| I$_3$ | " | 0.1565 | 0.440 | 0.342 | 0.213 | 0.005 | 0.817 |
| I$_2$ Nitrided at 823 K | | — | 0.420 | 0.400 | 0.716 | 0.004 | 0.848 |
| I$_2$ Nitrided at 1023 K | | — | 0.370 | 0.545 | 0.080 | 0.005 | 0.925 |
| K$_1$ | (Mo,W) C/Al$_2$O$_3$ | 0.245 | 0.113 | 0.551 | 0.232 | 0.084 | 0.844 |
| K$_2$ | " | 0.429 | 0.114 | 0.558 | 0.228 | 0.007 | 0.920 |
| K$_3$ | " | 0.564 | 0.24 | 0.293 | 0.373 | 0.094 | 0.930 |
| K$_4$ | (Mo,W) C/C | 0.391 | 0.452 | 0.236 | 0.286 | 0.026 | 0.868 |
| K$_5$ | " | 0.477 | 0.440 | 0.264 | 0.264 | 0.032 | 0.905 |
| K$_6$ | " | 0.567 | 0.534 | 0.214 | 0.226 | 0.026 | 0.867 |

$(a)$Selectivity of benzene in the cyclic products which are formed by dehydrocyclisation of n-hexane.

The mixed carbides which are supported encourage the dehydrocyclisation reaction in comparison with the tungsten or molybdenum monometallic carbides. The total activity passes a maximum as a function of the atomic ratio Mo/Mo+W which ranges from 0.39 to 0.57 for the mixed carbides which are supported on active carbon and from 0.24 to 0.57 for the catalysts which are supported on aluminium. In comparison, the catalysts on active carbon have a considerable hydrogenolysing (or cracking) activity, the maximum selectivities of cyclic products being displaced towards the ratios Mo/Mo+W ranging from 0.66 to 0.85. This is not the case for the mixed carbides on alumina the activity and selectivity in cyclic products of which remains within the range of x being from 0.24 to 0.43.

(b) Dehydrogenation of cyclohexane: The activity of these tungsten and molybdenum mixed carbides which are supported on alumina and active carbon are measured in the dehydrogenation of cyclohexane at a temperature of 673 K. The pressure and flow-rate conditions are identical to those for the catalysts in mass form. The results are expressed in $10^{-2}$ mols h$^{-1}$ g$^{-1}$ of W+Mo total metal in Tables X and XI:

TABLE X

Activity of the mixed carbides which are supported on alumina in the dehydrogenation of cyclohexane

| CATALYSTS | % $\frac{Mo}{Mo + W}$ | $V_D$ (a) |
|---|---|---|
| I$_1$ | 0 | 1.1 |
| I$_2$ | 11.16 | 2.6 |
| I$_3$ | 15.64 | 0.029 |
| K$_1$ | 24.5 | 1.8 |
| K$_2$ | 42.9 | 11.2 |
| K$_3$ | 56.4 | 6.24 |

(a) Dehydrogenation speed of cyclohexane into benzene.

TABLE XI

Activity of the mixed carbides which are supported on active carbons in the dehydrogenation of cyclohexane

| CATALYSTS | % $\frac{Mo}{Mo + W}$ | $V_D$ (a) |
|---|---|---|
| MLCl | 0 | 7.4 $10^{-3}$ |
| MLCl-A | 36.37 | 0.61 |
| MLC-B-4 | 45.75 | 0.75 |
| MLC-B-5 | 66.01 | 3.65 |
| MLC2 | 66.35 | 0.56 |
| MLC-B-6 | 78.56 | 4.9 |
| MLC-4 | 100 | 0.79 |
| K$_4$ | 39.1 | 26.8 |
| K$_5$ | 47.7 | 13.0 |
| K$_6$ | 56.7 | 2.3 |

(a) Dehydrogenation speed of cyclohexane into benzene.

The most active catalysts in the dehydrogenation of cyclohexane are the mixed carbides which are supported on alumina K$_1$, K$_2$, K$_3$ for $$\frac{Mo}{Mo + W}$$

ranging from 0.24 to 0.57) and supported on active carbon (K$_4$, K$_5$ for x ranging from 0.39 to 0.48).

Moreover, the use of n-hexane containing up to 800 ppm, by weight, of thiophene has shown that the W and Mo mixed carbides in bulk form are insensitive to sulphur poisons and thus have an interesting thio-resistance property which avoids a hydrotreatment stage to remove the sulphur compounds from the petroleum products. On the contrary the supported catalysts are effected by the thiophene, the activity and the selectivity of the cyclic products rapidly declines but this contamination by sulphur is reversible. The original properties of the catalyst gradually reappear after interruption with the injection of thiophene or after treatment at from 823 K. to 1,023 K. under hydrogen over a period of 12 hours The tungsten and molybdenum mixed carbides may thus resist a charge accidentally containing a large content (up to 800 ppm) of sulphur products whereas conventional reforming catalysts which are based on platinum are irreversibly contaminated by quantities of sulphur greater than 10 ppm in charges which are treated in catalytic reforming.

We claim:

1. In a process for reforming petroleum products by the catalysis of dehydrocyclization, isomerization, hydrogenolysis and dehydrogenation reactions, the improvement wherein the catalysts employed comprise a carbide corresponding to the formula: $(Mo_xW_{1-x})_yC_z$ wherein $0<x<1$, $1 \leq y \leq 2$ and $0.8 \leq z \leq 1$, and said catalysts are initially nitrided at about 1,023 K. in a mixture of $N_2$ and $H_2$ before use.

2. The process according to claim 1, wherein said catalysts contain up to 0.5%, by weight, of free C.

3. The process according to claim 1, wherein said catalysts are in bulk form, in the form of powder having a granulometry of less than 5 um (Fisher test).

4. The process according to claim 1, wherein said catalysts are supported on active carbon or alumina.

5. A process according to claim 1, wherein said mixture of $N_2$ and $H_2$ is equimolecular.

6. The process according to claim 1, wherein $0.15 \leq x \leq 0.70$.

* * * * *